United States Patent [19]
Barbará et al.

[11] Patent Number: 5,475,753
[45] Date of Patent: Dec. 12, 1995

[54] APPARATUS AND METHOD FOR CERTIFYING THE DELIVERY OF INFORMATION

[75] Inventors: Daniel Barbará, Princeton, N.J.; Calton Pu, Lake Oswego, Oreg.

[73] Assignee: Matsushita Electric Corporation of America, Secaucus, N.J.

[21] Appl. No.: 151,111

[22] Filed: Nov. 12, 1993

[51] Int. Cl.⁶ .................................................. H04L 9/00
[52] U.S. Cl. ................................ 380/4; 380/25; 380/30
[58] Field of Search ................................ 380/4, 23, 25, 380/30

[56] References Cited

U.S. PATENT DOCUMENTS

| | | |
|---|---|---|
| 4,653,048 | 3/1987 | Anderson et al. |
| 4,755,995 | 7/1988 | Anderson et al. |
| 4,849,978 | 7/1989 | Dishon et al. |
| 4,864,569 | 9/1989 | DeLucia et al. |
| 4,868,877 | 9/1989 | Fischer ........................... 380/30 |
| 4,964,127 | 10/1990 | Calvignac et al. |
| 5,005,200 | 4/1991 | Fischer ........................... 380/30 |
| 5,019,963 | 5/1991 | Alderson et al. |
| 5,022,028 | 6/1991 | Edmonds et al. |
| 5,029,078 | 7/1991 | Iwai. |
| 5,062,045 | 10/1991 | Janis et al. |
| 5,065,400 | 11/1991 | Masuishi et al. |
| 5,103,476 | 4/1992 | Waite et al. ..................... 380/4 |
| 5,142,680 | 8/1992 | Ottman et al. |
| 5,155,837 | 10/1992 | Liu et al. |
| 5,164,988 | 11/1992 | Matyas et al. ................... 380/30 |
| 5,179,703 | 1/1993 | Evans. |
| 5,204,897 | 4/1993 | Wyman ............................ 380/4 |
| 5,204,961 | 4/1993 | Barlow ............................ 380/6 |
| 5,214,702 | 5/1993 | Fischer ........................... 380/50 |
| 5,222,134 | 6/1993 | Waite et al. ..................... 380/4 |

OTHER PUBLICATIONS

S. Rangarajan et al., "Rectifying Corrupted Files in Distributed File Systems", Published in Proceedings of the 11th International Conference on Distributed Systems, May 1991.

S. Rangarajan et al., "Optimal Remote File Comparison in Replicated File Systems", Unpublished, Date unknown, Prior to Filing Date of this Application.

Daniel Barbara et al., "A Class of Randomized Strategies for Low–Cost Comparison of File Copies", *IEEE Transactions on Parallel and Distributed Systems*, vol. 2, No. 2, pp. 160–170 (Apr. 1991).

*Primary Examiner*—Salvatore Cangialosi
*Attorney, Agent, or Firm*—Ratner & Prestia

[57] ABSTRACT

A method and apparatus by which the recipient of several pieces of newly released information can automatically verify its accurate delivery is disclosed. The first step in the method is to generate a certificate, for example, a checksum, for each of the pieces of information. The certificates are combined, for example, using an exclusive OR function to form elements of a release vector such that each certificate is used to generate multiple ones of the release vector elements. The release vector and a program are then delivered to the recipient by one medium while the pieces of information are delivered by another medium. The program is used at the recipient's location to generate a current vector using the same methods that were used to generate the release vector. Next, the current vector is compared to the release vector and the result is used to identify missing or corrupted pieces of the delivered information.

18 Claims, 3 Drawing Sheets

APPARATUS AND METHOD FOR CERTIFYING THE DELIVERY OF INFORMATION

BACKGROUND OF THE INVENTION

This invention relates to the delivery of information from a sender to a recipient and, more particularly, to the automatic verification of the accurate delivery of electronically encoded information to a recipient.

Information often consists of separate pieces that are to be delivered individually. Such a situation frequently arises when there is a new release of electronically encoded information that is used to supplement or update an existing information base held by a recipient; for example, when a new version of a software system is released by a software publisher. The process of delivering these new releases of information consisting of separate pieces can be cumbersome. The recipient must not only reassemble the pieces, but must ensure that all the pieces have been received and are error free. The process can be very labor intensive and can require the active participation of both the sender and the recipient.

As mentioned above, one example of a situation in which the delivery of pieces of information is involved is the propagation of a software release by a software publisher. A new software version may consist of tens to hundreds modules of source and/or object code, data and text files released together. These modules are desirably delivered and installed together in order to guarantee accurate performance of the new release. Often, however, the modules are transmitted and copied asynchronously, i.e. at separate times. The actual transmission can take place via electronic mail, file transfer protocols, diskettes, or other means. These separate transmissions must then be assembled to reproduce the complete release package and checked for inaccuracies and omissions.

As another example, electronic document transmission frequently involves delivery of multiple items. A document can consist of several pieces, such as drawings, text, and audio. New versions of that document are likely to involve changes in some but not all of these pieces. Here, as in the case of software propagation, accurate delivery and assembly of the various pieces must be ensured.

Currently, in the software field, propagation of new versions is carried out with a great deal of human intervention. New software modules are sent or carried to each recipient where the sender then decides whether all the pieces for a new release installation are in place. An installer then proceeds to expand any compressed modules and/or compile and link the modules to generate the new release for the recipient. This process is prone to errors and is especially cumbersome if the number of recipients is large. Among the problems that face software distribution today are the following:

1. it may represent a lot of work for the installer of the software;
2. it may require the installer of the software to be extremely familiar with the new release;
3. the contents of the version may not be certain (some old modules with the same name may be mixed up with the newer version of other modules, or a number of modules may be corrupted because of errors).

Checksums, cyclic redundancy codes and error detecting codes have been employed to characterize pieces of data in situations where there is a release of multiple items of data and/or programs. A 16-bit check sequence which is data-dependent and calculated on the contents of the data field, is found in U.S. Pat. No. 4,964,127 of Calvignac, et al. That system is applied to data transmitted along a data path, presumably in digital format.

Combining checksums in a triply redundant data base to determine if the information in any of the copies contains errors or if any of the information is missing has been addressed in a paper in *IEEE Transaction on Parallel and Distributed Systems*, vol. 2, No. 2, April 1991, called "A Class of Randomized Strategies for Low-Cost Comparison of File Copies," by Daniel Barbará and Richard J. Lipton. In that application, two sites, each with a copy of the file, exchange checksums or a vector of combined checksums. Each site then generates its own checksum to be compared with the checksum that was sent. By comparing checksums or vectors, each site can determine which pieces of information may be damaged or missing in their local copy. This system, however, acts only as a check to ensure that two copies of the same file are identical. A given recipient can only identify inconsistencies. A voting scheme is needed to determine which copy is valid. The described system, however, cannot deal with the release of new information from a sender in the form of additions, substitutions or revisions.

U.S. Pat. No. 4,864,569 to DeLucia et al. discloses a method of checking releases that involves storing code in a data base. Each time a program is run, the system makes a line by line comparison of the code with the new release. Any differences that are found are checked against a data base of changes stored in the system's memory. If the differences comport with changes logged in the data base, the user is assured of having the new version. If the differences do not compare with the stored changes, a message is sent indicating errors in the updated version.

This system operates in several steps: the comparison of the new code to the old code, the comparison of the differences between the new and old codes with the changes logged in the data base, and the storage of this information. A more efficient method of verifying accuracy of the releases is desired. In addition, methods using comparison systems of the type described in this reference do not identify which parts of the program are missing. It is desirable for a system to indicate specifically to the recipient which modules are missing or damaged.

SUMMARY OF THE INVENTION

The present invention provides a method by which the recipient of several pieces of newly released information can automatically verify its accurate delivery, and apparatus for accomplishing the method. The method includes: generating a certificate for each of the pieces of information; combining the certificates into a release vector delivering the release vector and a program to the recipient; using the program, at the recipient's location, to generate a current vector; comparing the current vector to the release vector; and using the result to identify missing or corrupted pieces of the delivered information.

In an exemplary embodiment, these certificates are checksums computed for each of the modules of a revised computer program release. The transmitted program compares each element of the release vector to that of the current vector to determine which modules are missing or corrupted. In an alternative embodiment, two programs are delivered to the recipient: one that produces the current vector and one that compares the current vector to the release vector and identifies missing or corrupted modules.

DETAILED DESCRIPTION OF THE INVENTION

Figure 1:
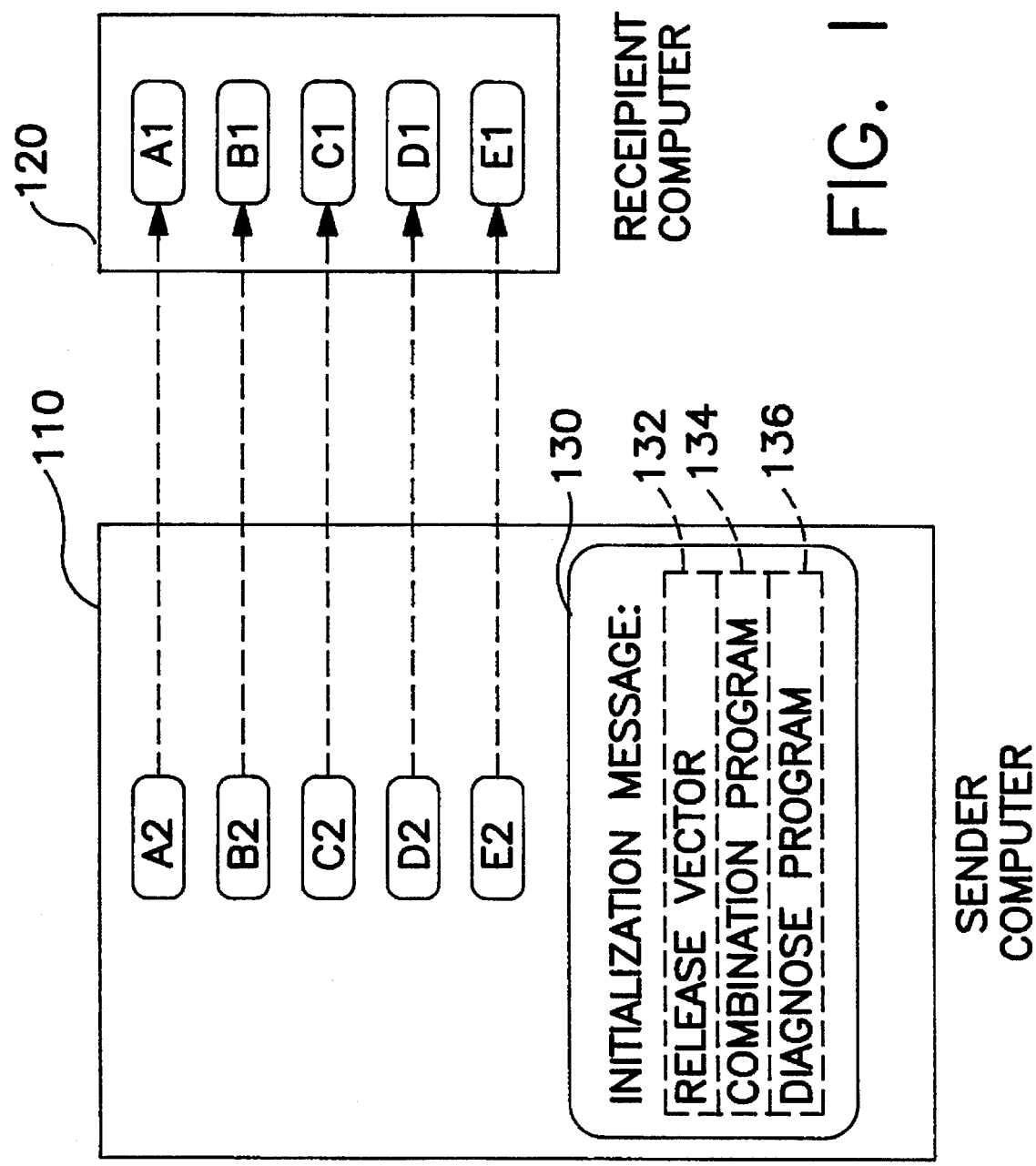
FIG. 1 is a block diagram showing pieces of information held by the sender and the recipient before a new release.

Using the present invention, a recipient computer 120 can automatically verify accurate delivery of a plurality of pieces of information without the active participation of a sender computer 110. After a new release is developed by the sender, a certificate is generated for each of the pieces of information (e.g. program and data files) involved in the new release on the sender computer 110. In the exemplary embodiment, each of these certificates is a simple checksum. These certificates are then combined by a program running on the sender computer 110 into a release vector 132.

The release vector 132 has a fixed number of components or elements. Each of the elements of the release vector is formed by combining several certificates. That is, a number of certificates is assigned, for example pseudorandomly, to each element of the release vector and the assigned certificates for each element are combined to produce the vector element. Each certificate is assigned to several vector elements. The pieces of information which constitute the new release are then delivered to the recipient computer 120, as well as the release vector and a program which is used to regenerate the release on the recipient computer 120.

Once the recipient computer 120 receives the information, the release vector, and the program, the computer 120 executes the program to generate a current vector. The program generates or reads certificates for the pieces of information and assigns those certificates to the elements of the current vector according to the same pseudorandom assignment used by the sender computer 110. In that way, assuming perfect delivery and reassembly of the new release, the elements of the current vector will exactly match the respective elements of the release vector.

Once the current vector is generated, the program executing on the recipient computer 120 compares the current vector to the release vector sent by the sender computer 110. If any of the delivered information has been imperfectly delivered or is otherwise missing or corrupted, the certificate generated for that piece of information by the recipient 120 using the program will not match the certificate generated by the sender for that piece of information. Correspondingly, the current vector elements which include that certificate will not match the respective elements of the release vector. Taking into account the pseudorandom assignment of the certificates, the program in the recipient compares the current vector to the release vector. Because of the imperfect correlation of the vectors as a result of missing or corrupted pieces of information, the program determines which certificates are incorrect. In the exemplary embodiment of the invention, the incorrect certificates are the ones that are common to more than a threshold number of the mismatched elements of the current vector and the release vector. This, in turn, leads the program to a determination of which pieces of information are incorrect. Based upon this determination, the recipient can then have the sender re-transmit the incorrect pieces of information.

A number of techniques, such as checksums, cyclic redundancy codes and error detecting codes can be used to compute a certificate for a piece of information. A "certificate" is intended to mean any designation of the contents of a module. Those skilled in the art of designing electronic information transmission systems will be able to produce many variations of such a certificate. In the preferred embodiment of this invention, a simple checksum on the module will suffice. The number of bits used for the checksum value, however, will have an effect on the accuracy of the method in diagnosing missing modules.

A number of techniques can be used to combine individual certificates in order to generate a release vector. The method used, however, must be reproducible by the recipient using the program that computes the current vector. Again, those skilled in the art will recognize many variations on the methods illustrated by way of example in this specification to combine certificates.

In one such method, a pseudorandom number generator is used to assign the checksums or certificates to elements of the release vector. In the code that implements this process, each element of the release vector is opened in turn. While each element is open, successive iterations are made through each of the certificates or checksums that have been generated. While each certificate is being considered within an open element, a random number is generated. If this random number falls within a given range, for example equal to or less than 1/10 of the range covered by the random numbers, that certificate is assigned to that element. In the exemplary embodiment of the invention, certificates assigned to an element are combined by way of a bit-wise Exclusive OR operation to generate the vector element.

If the randomly generated number is not within that range, the certificate is not assigned to the element. The next certificate is then considered for that element. This process is repeated until a number of certificates are assigned to each element of the release vector. Once all the elements have been filled, the release vector is complete.

Sample code using this method to generate the release vector is given below.

```
#define f 10
#define m 100
#define n 1000
main( ){
  char current_vec[m], certificate[n], in[m,n];
  int i;
  float prand( );
    for (i = 0;i < m;i++){
      for (j = 0; j < n; j++){
        if (prand( ) <= 1/f){
          current_vec[i]   =certificate [j]
          /* XOR the certificate
            with the vector
            component*/
          in[i,j]=1/* mark the module as
            being in the vector
            component*/
      }
    }
  }
}
```

Again, it is important that a pseudorandom number generator be used so that the combination sequences may be reproduced by the program used by the recipient to generate the current vector. Accordingly, the routine listed above may be transmitted to the recipient as a part of the combination program.

Although a pseudorandom number generator is used to assign certificates to vector elements in the exemplary embodiment of the invention, it is contemplated that other methods may be used. These include, for example, assigning certificates to individual vector elements according to a regular pattern such that no two certificates are assigned to the same set of vector elements. It is contemplated that other methods may also be used to ensure that each certificate is represented by a respectively different plurality of vector elements.

Once the release vector has been generated using the above method, or any other method known in the art to combine the certificates, that release vector and at least one program are sent to the recipient. By separate means, the new release of information itself is transmitted to the recipient. FIG. 1 illustrates the respective information possessed by the sender and the recipient prior to any transmission. As can be seen, the recipient possesses five modules of information labelled A1, B1, C1, D1, and E1. The sender has prepared a new release consisting of five new modules labelled A2, B2, C2, D2, and E2. FIG. 1 also illustrates that the sender is in possession of a release vector 132, a combination program 134, and a diagnose program 136. (The use of two programs is only one possibility; it is contemplated that a single program can be used to accomplish both the combining and diagnosing functions.) These items, the vector 132, combination program 134 and, optional diagnose program 136, constitute an initialization message 130 which signals the propagation of a new release.

Figure 2:
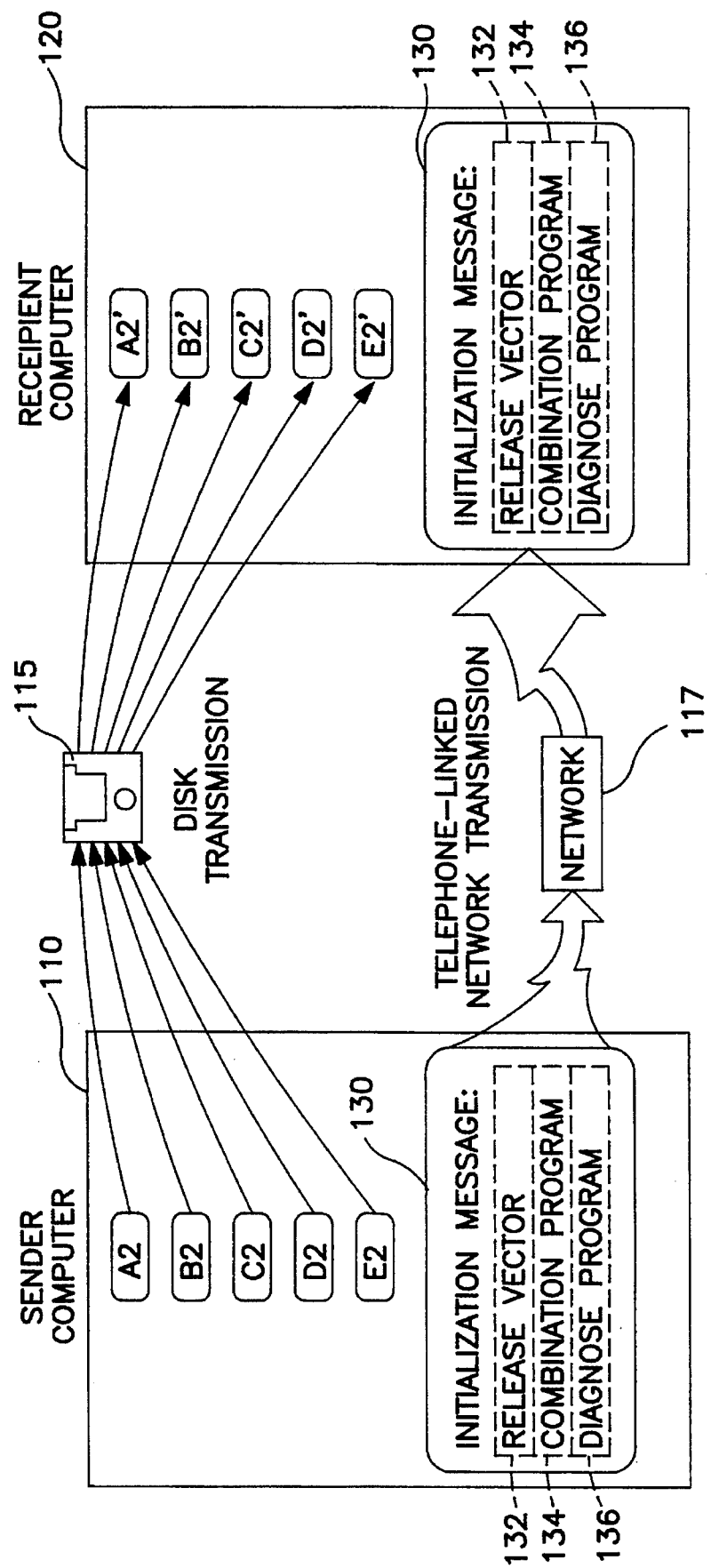
FIG. 2 is a block diagram showing the transmission of the pieces of information.

FIG. 2 illustrates the transmission of the information to the recipient. In this exemplary embodiment of the invention, the information modules A2, B2, C2, D2 and E2 are sent to the recipient by disk 115, and the release vector 132 and programs 134 and 136 are transmitted through, for example, a telephone-linked network 117. It is contemplated, however, that any means known in the art can be used to transmit this information. In the exemplary embodiment, the relatively large data modules A2, B2, C2, D2 and E2 and the relatively small initialization message 130 are sent separately to reduce transmission failure risk. In FIG. 2, the recipient has received modules A2', C2', D2' and E2' which should correspond to modules A2, C2, D2 and E2 of the new release. Module B2, however, was not effectively received by the recipient. The recipient computer 120 therefore retains module B1. The initialization message 130 consisting of the release vector 132, the combination program 134, and the diagnose program 136 has been received by the recipient. Thus, the recipient has received some, but not all, of the new modules.

Two methods are contemplated for allowing the recipient to obtain the certificates for a set of modules. First, the combination program 134 may be configured to generate the certificates using the same algorithm that was used to produce the certificates at in the sender's computer system 110. If the release contains a large number of modules, however, this method may be time consuming. Alternatively, the certificates may be added to each module at a predetermined location, for example after the end-of-file marker but before the actual end of the file. If the alternative method is used, the combination program would simply read the certificates from the respective modules and combine them to form the current vector.

Figure 3:
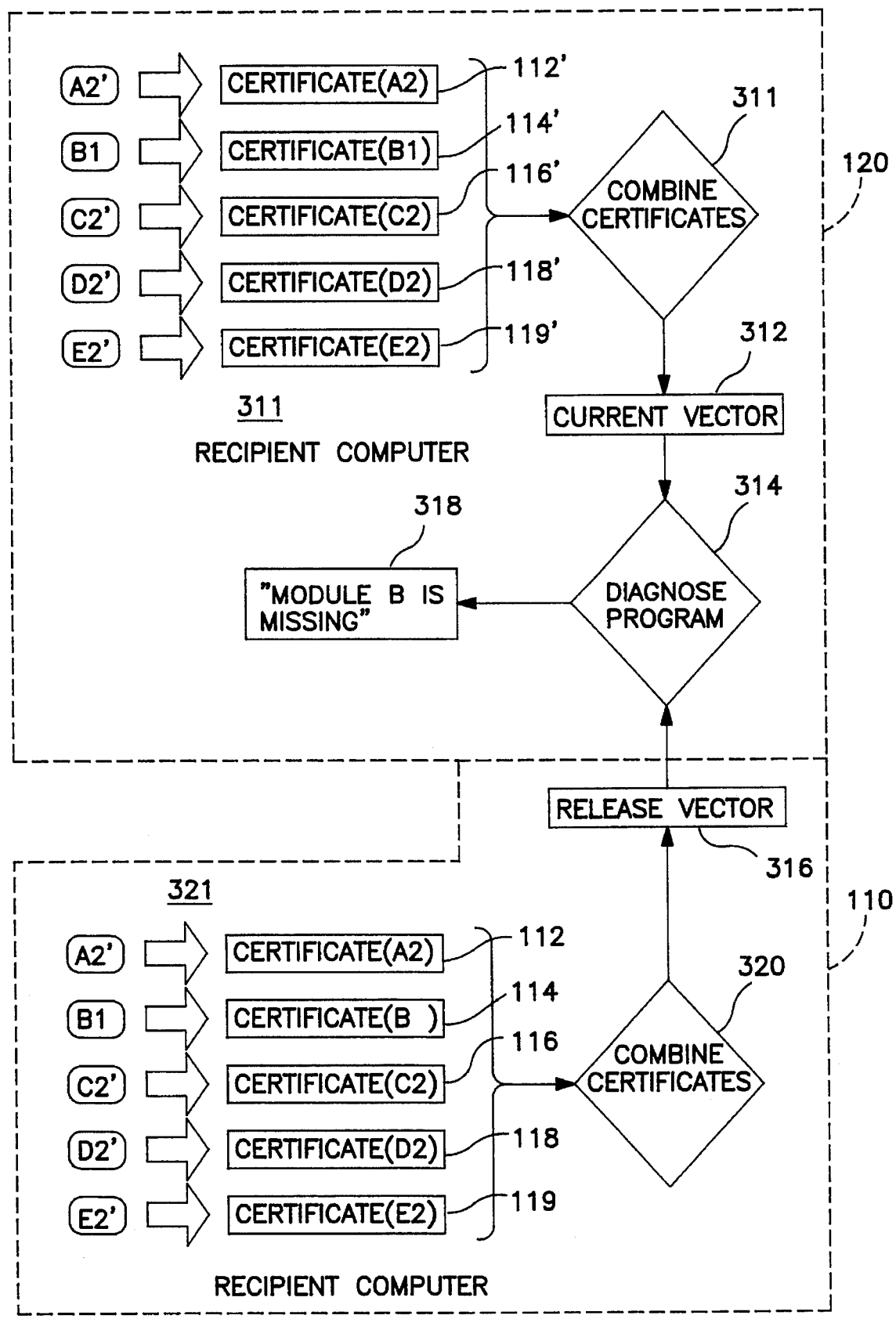
FIG. 3 is a flow chart indicating the functions performed by the sender computer and recipient computer shown in FIG. 2.

FIG. 3 shows the flow of operations in the sender computer and in the recipient computer. At the sender computer 110, the certificates 112, 114, 116, 118 and 119 are generated from the respective modules A2, B2, C2, D2 and E2 in step 321. At step 320, these certificates are combined to generate a release vector 316. In this step, each certificate is assigned to multiple vector elements and all of the certificates assigned to a vector element are combined to generate the vector element. An exemplary program that may be used to combine the certificates to generate a vector is described above.

The release vector and the modules are transmitted to the recipient computer 120 as described above. At step 311, the recipient computer either computes or reads the certificates 112', 114', 116', 118' and 119' from the received modules A2', B1, C2', D2' and E2'. In the particular instance that is illustrated, the certificates 112', 116', 118' and 119' should match the respective certificates 112, 116, 118 and 119. The only difference should be between the certificates 114 and 114'. If, however, the modules A2, C2, D2 and E2 were corrupted during or after transmission, there may be mismatches in the other pairs of certificates.

The certificates 112', 114', 116', 118' and 119' are combined at step 310 to produce the current vector 312. An exemplary program used to combine the certificates to form the vector is described above. This program is preferably the same program that was used to generate the release vector.

At The current vector and the release vector are used, at step 314, as inputs for the diagnose program. An exemplary program, suitable for use as the diagnose program 314 is described below.

The diagnosis of the release can be carried out in many ways, as will be understood by those skilled in the art of computer programming. As an example, the elements of the current vector may be compared to the elements of the release vector to identify differing elements. The modules having certificates which were combined to form the differing elements may then be marked as possibly containing errors. Each module having more than a predetermined number of marks is then identified as being erroneous.

Since the certificate of each module is assigned to multiple vector elements, an error in one certificate may cause differences to appear in many of the vector elements of the current vector relative to the corresponding elements of the release vector. When each module of each of the different vector elements is marked, the erroneous certificate will receive marks from each of the different vector elements and, so, will have more marks than the error-free modules.

The modules corresponding to the erroneous certificates are considered to have been improperly transmitted. An example of program code that may be used as the diagnose program 314 in the exemplary embodiment of the present invention is given below.

```
#define delta 5
int diagnose [n]
main( ){
int count([];
    for (i = 0; i < m; i++)
        if (current_vec[i] = release_vec[i])
            for (j = 0; j < n; j++)
                if (in[i,j])
                    count[j]++
            for (j = 0; j < n; j++)
                if (count[j] >= delta)
                    diagnose[j] = 1
}
```

In the above program, the array in[i, j] is generated by the combination program 310, as shown above, when the current vector is generated from the individual certificates.

In the exemplary program, the modules in diagnose[n]

that contain a number, delta (i.e. 5), or more counts are reported, at step 318, as missing (or damaged). The recipient can then have the sender re-transmit those modules.

By way of example, and not intended as a limitation, the present invention can be used to certify accurate transmission of information where the modules are either source or object computer programs. Certificates are generated by the sender for each of the programs intended to be released. These certificates are then pseudorandomly combined, as described above, to produce the release vector. The new program modules are sent to the recipient, as are the release vector and programs for generating a current vector and diagnosing the current vector by comparing it with the release vector.

If the diagnosing program determines that any of the delivered programs is missing or corrupted, the sender is notified and the missing or corrupted program is re-transmitted. In this way, software publishers can update their software and ensure accurate delivery of the updated versions with considerably less effort and time requirements than heretofore possible.

Delivery of data modules can also be verified using the present invention. The data modules can be sent alone or in combination with program modules. In either case, the sender generates a certificate for the modules to be sent and transmits them, along with the combination and diagnose programs for use by the recipient. Data modules can also include any literature information such as user manuals, drawings, text files, or any other machine coded information. The data modules are expanded (if necessary) and evaluated by the programs according to the present invention to ensure that they have been properly transmitted. As described above, this evaluation may comprise, for example, computing a current vector for the modules, comparing the current vector to the release vector, and identifying the missing or damaged modules.

Often, only a few of several modules that make up a software system need to be replaced in a new release of the system. In this case, less than all available modules may be sent to the recipient. The present invention can ensure that this partial transmission of information is accurately delivered by following the above-described method. A certificate is generated for the module to be replaced, and a release vector is computed using this certificate along with the certificates previously obtained for the original modules. The new vector incorporating the certificate for the new module or partial release is transmitted to the recipient along with the new module and accompanying programs. The recipient then generates a current vector for the information incorporating the new module. The diagnosing program uses the current vector and the release vector to determine whether the new release was properly transmitted and incorporated into the recipient's operation. In this instance, the certificates for the existing modules can include custom modifications to the modules which are known to the sender but which are unique to the recipient.

Another exemplary application of the present invention may be used in the case where only patches to existing modules are to be sent. In this alternative implementation, the combination program may enter these patches or modifications into the source or data files, compile and bind the resulting object files and then generate certificates for each of the object files and each of the patched data files. These certificates are then used to generate the current vector which is compared to the release vector as described above. This alternative method has the advantage of being able to identify modules which have been patched locally by the user, unknown to the sender, and so, may not operate properly in the new release.

One advantage of this type of system is that it allows for customized software. Custom modules which are different for different customers produce respective different certificates. These certificates are combined in the release vector which is transmitted to the customer. In the same manner, the different certificates are processed by the combination program at the customer's location to produce the current vector. The current vector and release vector are compared, by the diagnose program, as described above to locate any erroneous modules. In this instance, the same combining program and diagnose program may be used for all releases. The only data that differs from one customer to the other are the actual modules and the release vector.

The exemplary embodiments and applications described herein are included for explanation purposes only and are not intended to limit the scope of the present invention. Those skilled in the art will recognize that other embodiments and applications may exist for verifying the accurate delivery of information and those embodiments and applications are intended to be fully covered by the present invention.

The Invention claimed is:

1. A computer implemented method of verifying the accurate delivery of a plurality of pieces of electronically encoded information comprising the steps of:
   a) generating a certificate for each of the pieces of information;
   b) combining the generated certificates into a release vector having plurality of elements;
   c) delivering the pieces of information to a recipient;
   d) delivering the release vector and a program to the recipient, the program being adapted to obtain the certificates from the delivered pieces of information and to combine the obtained certificates to produce a current vector;
   e) producing the current vector for the delivered pieces of information, using the delivered program, wherein the current vector has a plurality of elements; and
   f) comparing respective elements of the current vector to the release vector to identify missing or corrupted ones of the pieces of the delivered information based on differences between the current vector and the release vector.

2. A computer implemented method according to claim 1 in which the elements in each of the release vector and the current vector are fewer in number than the pieces of information.

3. A computer implemented method according to claim 2 wherein step b) includes the step of assigning the generated certificates to the elements of the release vector according to a predetermined pseudorandom assignment scheme.

4. A computer implemented method according to claim 3 wherein step e) includes the step of pseudorandomly assigning each of the obtained certificates to a respective plurality of the elements of the current vector using a pseudorandom assignment scheme which is the same as the pseudorandom assignment scheme used to assign the generated certificates to elements of the release vector.

5. A computer implemented method according to claim 1 wherein step a) includes the step of calculating a respective checksum for each of the pieces of information.

6. A computer implemented method according to claim 1 wherein step c) includes the steps of:

c1) delivering the pieces of information to the recipient by a first means, and c2) delivering the release vector and the program to the recipient by a second means.

7. A computer implemented method according to claim 1 wherein step d) includes the steps of delivering the program and a further program, the program being adapted to produce a current vector for the delivered pieces of information, and the further program being adapted to compare the current vector to the release vector and to identify missing or corrupted ones of the pieces of delivered information.

8. A computer implemented method according to claim 1 wherein step f) comprises the steps of:

f1) comparing each element of the current vector to a respective one of the elements of the release vector;

f2) noting each element the current vector which differs from the respective element of the release vector;

f3) determining which certificates are assigned to more than a predetermined number of the marked elements; and f4) indicating that the pieces of information corresponding to the determined certificates are missing or corrupted.

9. A computer implemented method according to claim 1 wherein the pieces of information include computer program modules.

10. A computer implemented method according to claim 1 wherein the pieces of information include data modules and text modules.

11. A computer implemented method of verifying the accurate delivery of N pieces of information, where N is an integer, comprising the steps of:

a. generating N checksums, one checksum for each of the pieces of information;

b. combining the N checksums into a release vector having M elements, where M is an integer less than N, by assigning each of the N checksums to a respectively different subset of the elements of the release vector;

c. delivering the pieces of information to a recipient;

d. delivering the release vector, an announcement of the pieces of information, and a program to the recipient, the program being adapted to obtain the N checksums from the N delivered pieces of information and to assign each of the N obtained checksums to elements representing a respectively different subset of M elements of a current vector;

e. generating the current vector for the delivered pieces of information using the delivered program; and f. comparing each of the elements of the release vector to a respective one of the elements of the current vector to determine which of the pieces of information are missing or corrupted.

12. A computer implemented method of verifying the accurate delivery of a plurality of modules of revised computer code comprising the steps of:

a. generating a checksum for each of the modules;

b. using a first program to combine the checksums into a release vector having elements which are fewer in number than the pieces of information, the first program being adapted to assign the checksums to the elements based on the values of the numbers according to a predetermined criteria;

c. delivering the modules to a recipient;

d. delivering the release vector, an announcement of the revised modules, and a second program to the recipient, the second program adapted to produce a current vector having elements which are fewer in number than the delivered pieces of information by assigning further checksums, derived from the delivered modules, to the elements of the current vector according to the predetermined criteria;

e. producing a current vector for the delivered modules using the delivered program; and f. comparing the elements of the release vector to the respective elements of the current vector to determine mismatches between the elements of the current vector and the respective elements of the release vector and, based on this determination, to identify missing or corrupted pieces of the delivered revised modules.

13. Apparatus for verifying the accurate delivery of a plurality of pieces of electronically encoded information comprising:

processing means for generating a certificate for each of the pieces of information;

processing means for combining the generated certificates into a release vector having plurality of elements;

processing means for delivering the pieces of information to a recipient;

program means for obtaining the certificates from the delivered pieces of information and for combining the obtained certificates to produce a current vector;

processing means for delivering the release vector and the program to the recipient; and processing means for executing the program means to produce the current vector and for comparing respective elements of the current vector to the delivered release vector to identify missing or corrupted ones of the pieces of the delivered information based on difference between the current vector and the release vector.

14. Apparatus according to claim 13 in which the elements in each of the release vector and the current vector are fewer in number than the pieces of information.

15. Apparatus according to claim 14 wherein the processing means for combining the generated certificates into a release vector includes means for assigning the generated certificates to the elements of the release vector according to a predetermined pseudorandom assignment scheme.

16. A method according to claim 15 wherein the program means includes means for pseudorandomly assigning each of the obtained certificates to a respective plurality of the elements of the current vector using a pseudorandom assignment scheme which is the same as the pseudorandom assignment scheme used to assign the generated certificates to elements of the release vector.

17. Apparatus according to claim 13 wherein the processing means for generating a certificate for each of the pieces of information includes means for calculating a respective checksum for each of the pieces of information.

18. Apparatus according to claim 13 wherein the processing means for delivering the pieces of information to the recipient delivers the pieces of information via a first medium, and the processing means for delivering the release vector and the program delivers the release vector and the program via a second medium, different from the first medium.

* * * * *